C. T. LIPPOLD.
TIRE BLOW-OUT CLAMP AND EMERGENCY MUD HOOK.
APPLICATION FILED JULY 22, 1920.
1,392,425. Patented Oct. 4, 1921.
2 SHEETS—SHEET 1.
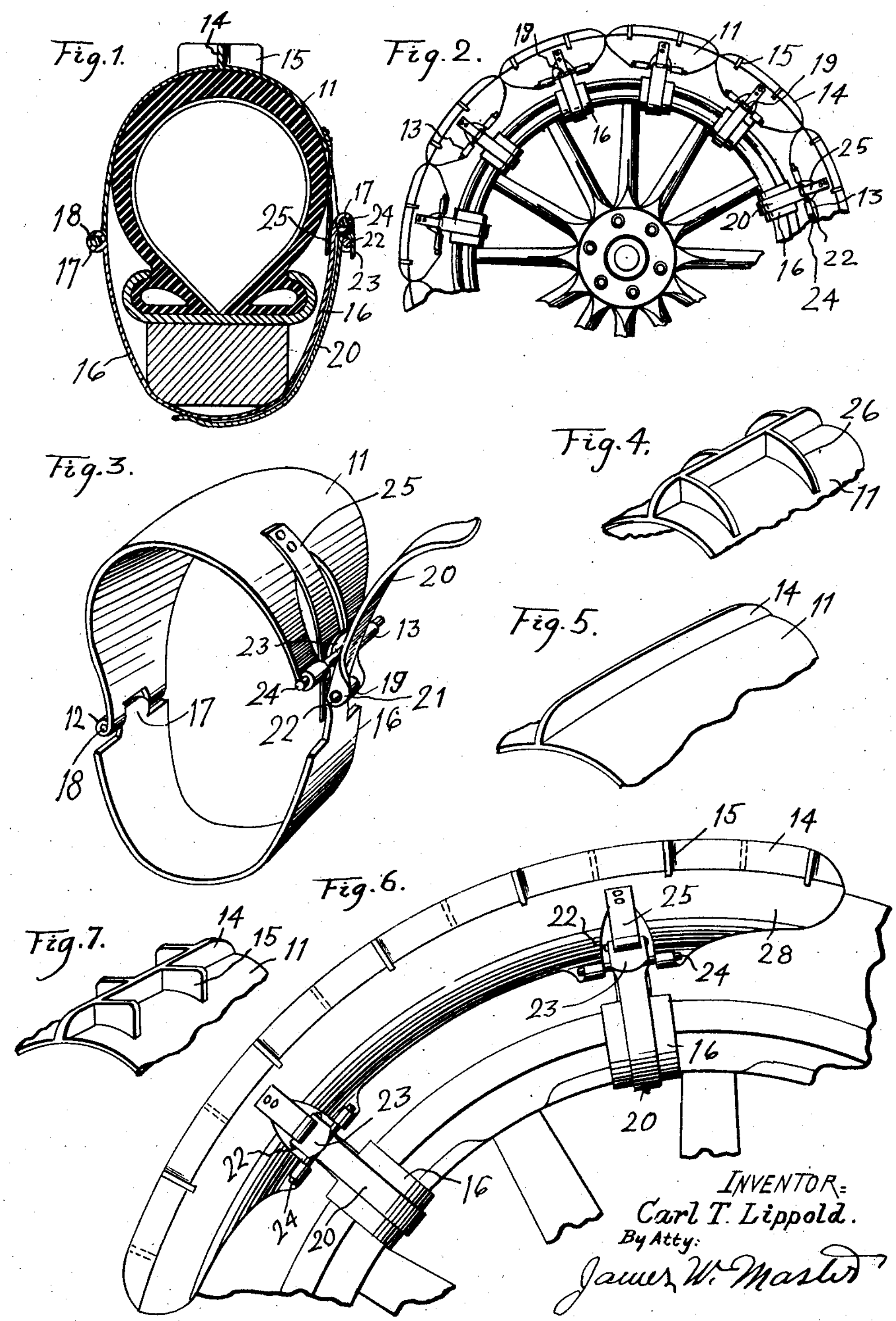
INVENTOR:
Carl T. Lippold.
By Atty:
James W. Master C. T. LIPPOLD.
TIRE BLOW-OUT CLAMP AND EMERGENCY MUD HOOK.
APPLICATION FILED JULY 22, 1920.
1,392,425. Patented Oct. 4, 1921.
2 SHEETS—SHEET 2.
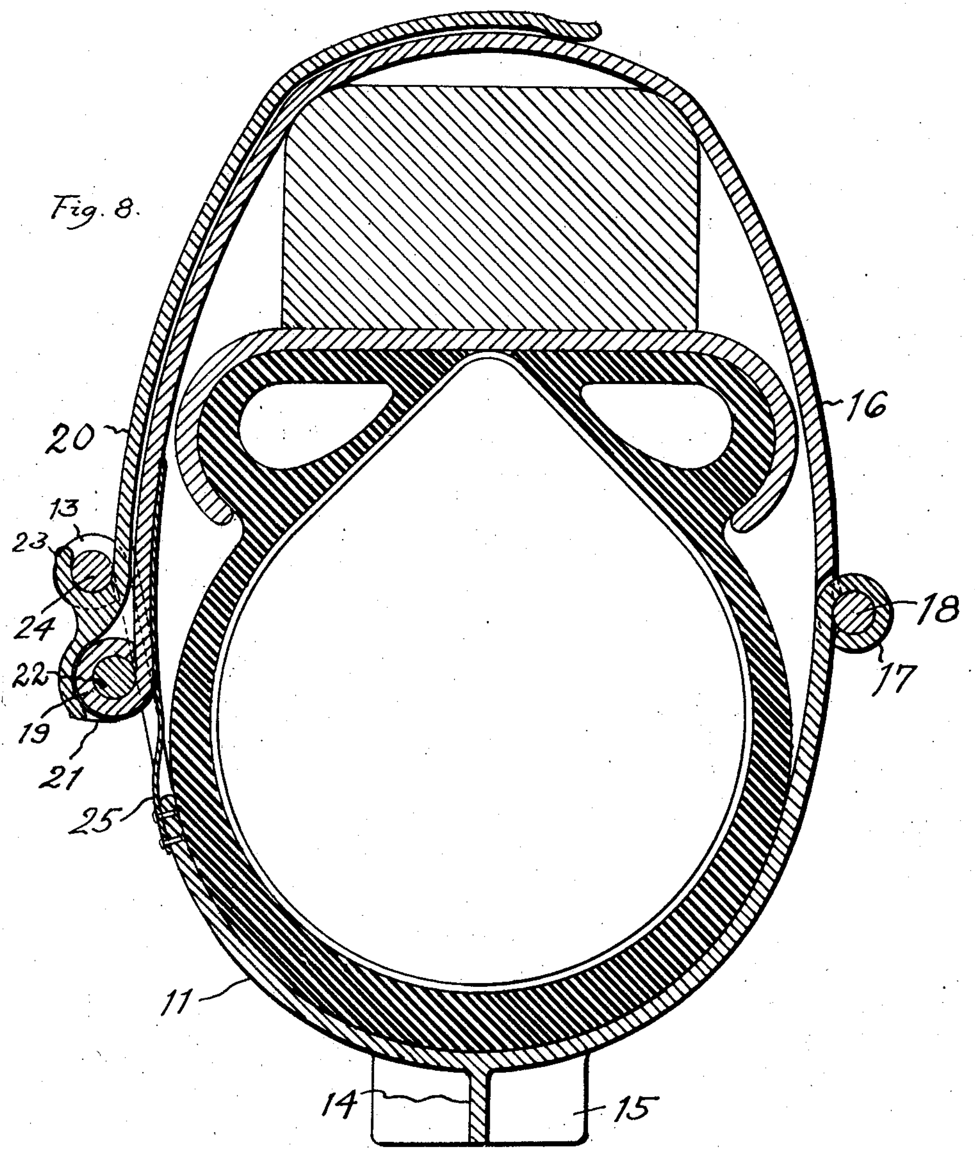
INVENTOR:
Carl T. Lippold.
By Atty:
Frederic M. Kearney.

UNITED STATES PATENT OFFICE.

CARL T. LIPPOLD, OF LOS ANGELES, CALIFORNIA.

TIRE-BLOW-OUT CLAMP AND EMERGENCY MUD-HOOK.

1,392,425. Specification of Letters Patent. Patented Oct. 4, 1921.

Application filed July 22, 1920. Serial No. 398,150.

*To all whom it may concern:*

Be it known that I, CARL T. LIPPOLD, a citizen of the United States, residing in the city and county of Los Angeles and State of California, have invented a new and useful Tire-Blow-Out Clamp and Emergency Mud-Hook, of which the following is a specification.

The present invention has relation to an improved device adapted to be clamped to the wheel of a motor vehicle to protect the tire and to facilitate traction in the mud, the device embodying a series of sections adapted to be clamped to the wheel rim and encircling the tire.

The objects of the invention are to provide a tire device embodying the novel details of construction as hereinafter set forth, and which may be readily attached to the wheel rim and detached therefrom, and to provide a device of this character of inexpensive construction which may be readily stamped from sheet metal.

Other objects of this invention will be made manifest as the description progresses, and it is to be understood that changes, alterations and modifications, falling within the scope of what is claimed, may be made without departing from the spirit of the invention or sacrificing any of its advantages.

Upon the annexed drawings, Figure 1 is a transverse sectional view of a wheel rim and tire with my improved clamp attached thereto. Fig. 2 is a fragmentary view of a wheel showing a plurality of the clamps thereon. Fig. 3 is a perspective detail view of a clamp, especially adapted for use in case of blow-outs. Fig. 4 is a fragmentary detail view of the clamp showing a modified form of the tread. Fig. 5 is a perspective detail view showing another modified form. Fig. 6 is a side view showing a modified form. Fig. 7 is a detail view of the tread. Fig. 8 is an enlarged detail view of my improved device.

Referring to the drawings, the device as shown in Figs. 1, 2 and 3, consists of a segmental tread member 11, having the knuckles 12 and 13, and provided with a longitudinal rib 14, and transverse ribs 15, alternately disposed on opposite sides of the central rib 14. A clamp member 16, provided with a hinge knuckle 17, is connected by the pintle 18, with tread member 11. The opposite end of member 16, is provided with a knuckle 19, and a lever 20, having the knuckles 21, is connected thereto by the pintle member 22. A lug 23, on member 20, is adapted to engage with a fixed pintle member or bar 24, mounted in knuckles 13, on member 11. A spring 25 fixed to member 11, extends between knuckles 13, and is adapted to press against the clamp member 16, when the device is applied to a wheel rim and tire.

When the device is attached for use, the clamp portion of the device is adapted to abut against an adjacent spoke of the vehicle wheel. This prevents creeping on the tire, of the consecutive units of the device. In the operative position, the spring holds the lever 20 in folded position against the member 16, as shown in Figs. 1 and 2. In Fig. 3 the device is shown with the lug 23 in engagement with bar 24, before turning the lever to operative position.

In the modified form shown in Fig. 4, the lateral ribs 26 are rounded on the outer edge thereof, and in the modified form shown in Fig. 5, the lateral ribs are omitted. The longitudinal rib in each form serves to prevent side skidding of the vehicle.

In the modified form shown in Fig. 6, the longitudinal dimensions are such that four section units encircle the tire. The clamp members are disposed relative to the tread member 28, so as to abut against opposite sides of alternate spokes of the wheel, which serves to prevent longitudinal displacement of the tread members in either direction whatever may be the direction of rotation of the wheel. In the form shown in Fig. 3, both lateral and longitudinal ribs are omitted on the tread, thereby adapting the clamp for use in case of tire blow-outs.

It is to be understood that the device may be modified to be attached to any tire and wheel, and is constructed of sheet-metal, and may therefore be produced at small expense. The device when applied, serves to provide increased traction in mud or sand.

What is claimed is:

1. In a tractor device, a plurality of segmental units each consisting of a tread member, a clamp member hingedly connected to the tread member, a latch member hingedly connected to the clamp member, a lever integral with the latch member, a bar fixed to the tread member, said latch member engaging with the bar in operative position, and a spring adapted to press against the clamp member in operative position.

2. In a tractor device, the combination with a tread member 11, of a clamp member 16 hingedly connected thereto, a latch member 20 hingedly connected to the opposite end of the clamp member, a bar 24 fixed to the free end of the tread member, a lug 23 integral with the latch member and engaging with the bar 24, in the operative clamping position, and a spring 25 fixed to the tread member and having its free end pressing against the clamp member 16 in the operative clamping position.

3. In a tractor device a plurality of segmental units, each consisting of a tread member, a clamp member pivotally connected to the tread member, a latch member pivotally connected to the clamp member, and adapted to engage with the tread member, and a spring to hold the latch in operative position, said spring being fixed to the tread member and pressing against the clamp member at the point of connection with the latch member.

In testimony whereof, I hereunto affix my signature, this 28th day of June, 1920.

CARL T. LIPPOLD.